(12) United States Patent
Park et al.

(10) Patent No.: US 10,847,874 B2
(45) Date of Patent: Nov. 24, 2020

(54) VEHICLE ANTENNA MODULE

(71) Applicant: AMOTECH CO., LTD., Incheon (KR)

(72) Inventors: Jae-Il Park, Gyeonggi-do (KR);
Hyung-Il Baek, Gyeonggi-do (KR);
Kyung-Hyun Ryu, Seoul (KR)

(73) Assignee: AMOTECH CO., LTD., Incheon (KR)

(*) Notice: Subject to any disclaimer, the term of this patent is extended or adjusted under 35 U.S.C. 154(b) by 348 days.

(21) Appl. No.: 15/769,726

(22) PCT Filed: Oct. 21, 2016

(86) PCT No.: PCT/KR2016/011929
§ 371 (c)(1),
(2) Date: Apr. 19, 2018

(87) PCT Pub. No.: WO2017/069581
PCT Pub. Date: Apr. 27, 2017

(65) Prior Publication Data
US 2018/0316085 A1    Nov. 1, 2018

(30) Foreign Application Priority Data

Oct. 23, 2015 (KR) .......................... 10-2015-0147986

(51) Int. Cl.
*H01Q 1/00*    (2006.01)
*H01Q 1/32*    (2006.01)
(Continued)

(52) U.S. Cl.
CPC ........... *H01Q 1/3291* (2013.01); *H01Q 21/08* (2013.01); *H02J 7/025* (2013.01); *H02J 50/12* (2016.02);
(Continued)

(58) Field of Classification Search
CPC ...... H01Q 1/3291; H01Q 21/08; H01Q 1/523; H01Q 7/00; H01Q 9/265; H02J 50/12; H02J 7/523
See application file for complete search history.

(56) References Cited

U.S. PATENT DOCUMENTS 8,618,997 B2 * 12/2013 Kato .................. H01F 27/365
235/492
9,136,597 B2 *  9/2015 Blair ..................... H01Q 3/26
(Continued)

FOREIGN PATENT DOCUMENTS

CN          101222085 A     7/2008
CN          101233664 A     7/2008
(Continued)

*Primary Examiner* — Dinh T Le
(74) *Attorney, Agent, or Firm* — CL Intellectual LLC

(57) ABSTRACT

Disclosed is an antenna module for a vehicle, which can perform wireless power transmission for a portable terminal equipped with a magnetic resonance wireless power transmission function and a portable terminal equipped with a magnetic induction wireless power transmission function in one module. The disclosed antenna module for the vehicle stacks a first antenna unit having a first antenna that is an antenna for the magnetic resonance wireless power transmission and near field communication on one surface of a base sheet, and a second antenna unit having a second antenna that is an antenna for the magnetic induction wireless power transmission on one surface of the first antenna unit; and the second antenna is partially overlapped with the first antenna.

12 Claims, 10 Drawing Sheets

(51) Int. Cl.
*H02J 7/02* (2016.01)
*H02J 50/12* (2016.01)
*H01Q 21/08* (2006.01)
*H01Q 7/00* (2006.01)
*H01Q 9/26* (2006.01)
*H01Q 1/52* (2006.01)

(52) U.S. Cl.
CPC .............. *H01Q 1/523* (2013.01); *H01Q 7/00* (2013.01); *H01Q 9/265* (2013.01)

(56) References Cited

U.S. PATENT DOCUMENTS

| | | | |
|---|---|---|---|
| 9,905,925 B2 * | 2/2018 | Lee | H04B 5/0081 |
| 10,658,847 B2 * | 5/2020 | Peralta | H01Q 7/00 |
| 2008/0015809 A1 | 1/2008 | Alumbaugh et al. | |
| 2011/0065383 A1 | 3/2011 | Frankland et al. | |

FOREIGN PATENT DOCUMENTS

| | | |
|---|---|---|
| CN | 102498614 A | 6/2012 |
| CN | 103840533 A | 6/2014 |
| CN | 104218685 A | 12/2014 |
| CN | 104380850 A | 2/2015 |
| JP | 2005-198047 A | 7/2005 |
| JP | 2011-029814 A | 2/2011 |
| KR | 10-2004-0052869 A | 6/2004 |
| KR | 10-2013-0024757 A | 3/2013 |
| KR | 10-2013-0123857 A | 11/2013 |
| KR | 10-2014-0011955 A | 1/2014 |
| KR | 10-1372936 B1 | 3/2014 |
| KR | 10-1433306 B1 | 8/2014 |
| KR | 10-2014-0142163 A | 12/2014 |
| KR | 10-2015-0072138 A | 6/2015 |
| KR | 20150099478 A | 8/2015 |

\* cited by examiner

VEHICLE ANTENNA MODULE

CROSS-REFERENCE TO THE RELATED APPLICATIONS

This application is a National Stage of International Application No. PCT/KR2016/011929, filed Oct. 21, 2016, which claims priority from Korean Patent Application No. 10-2015-0147986 filed on Oct. 23, 2015 in the Korean Intellectual Property Office, the disclosure of which are incorporated herein by reference in their entirety.

TECHNICAL FIELD

Exemplary embodiments of the present disclosure relate to an antenna module for a vehicle, and more particularly, to an antenna module for a vehicle that performs wireless power transmission using a magnetic induction scheme and a magnetic resonance scheme, and performs wireless communication with a portable terminal.

BACKGROUND ART

Recently, electric devices, for example, mobile terminals such as a portable phone, a smart phone, a tablet PC, a notebook, a terminal for digital broadcasting, a Personal Digital Assistance (PDA), a Portable Multimedia Player (PMP), and a navigator that charge and use a battery by an external power source are increasingly used.

Accordingly, the surrounding environment related to the use of mobile terminals is spreading to a dynamic space such as a vehicle.

As part of that, the use of a charger that can easily charge the battery of the terminal even in the vehicle is increasing.

As an electrical connection scheme of a charger and a terminal (or a battery) in charging the battery in a vehicle, there is the scheme that connects the charger connected to a power source of the vehicle to the terminal through a contact terminal or a cable to supply an electrical energy thereto.

Among them, in the terminal supply scheme having a contact terminal in a charger and a terminal, if exposed to moisture, there is a concern that the charging energy is lost or fire is caused due to the instantaneous discharging phenomenon upon contact/separation, and the charging operation cannot be smoothly performed due to the contact failure.

Accordingly, a contactless charging system using a wireless power transmission scheme without constituting a contact terminal is proposed.

The contactless charging system supplies an electrical energy supplied from a power source of a vehicle by a wireless power transmission scheme, and includes a wireless power transmission module embedded in the vehicle and a wireless power reception module in a terminal side receiving the electrical energy from the wireless power transmission module.

The contactless wireless charging is classified into a magnetic induction scheme and a magnetic resonance scheme, and also classified into a PMA type and a Qi type depending on how the wireless power reception module senses access to the wireless power transmission module.

The magnetic induction scheme or the magnetic resonance scheme is the same in that the magnetic field is used, and an electromagnetic field is made using a coil, and the electrical power is transmitted through the electromagnetic field. However, the magnetic induction scheme uses an electromagnetic induction phenomenon between the coils, and the magnetic resonance scheme differs in that it can send far away using the magnetic resonance despite the low coupling coefficient between the coils.

That is, the magnetic induction scheme is a principle in which the magnetic field generated in a primary coil flows the induction current to a secondary coil to supply energy when the coils made with the same frequency are superposed on each other, and the magnetic resonance scheme is characterized by transmitting power directly without contacting the charging mat. The magnetic resonance scheme is fundamentally similar to the magnetic induction scheme in that the current is converted into the electromagnetic field through the coils, however, it is different by sending it far away in a resonance frequency.

Further, there are the advantages in that the magnetic induction scheme can have high transmission efficiency and perform transmission of the large power, and the magnetic resonance scheme can simultaneously charge a plurality of devices at once. Thus, the magnetic induction scheme and the magnetic resonance scheme have the different characteristics, but, the operating frequencies used by each other are different from each other.

As one example, the magnetic induction scheme uses the operating frequency band of 100 to 350 kHz, and the magnetic resonance scheme uses the operating frequency band of 6.765 MHz to 6.795 MHz.

Accordingly, since the magnetic induction scheme and the magnetic resonance scheme use different operating frequencies, respectively, there is a problem that they are not compatible with each other.

Meanwhile, in the magnetic resonance scheme operating in the high frequency band of 6.765 MHz to 6.795 MHz, if the coupling coefficient between the coils is excessively high, split is caused to reduce the charging efficiency, and in the magnetic induction scheme operating in the low frequency band of 100 to 350 kHz, the higher the coupling coefficient, the higher the charging efficiency.

Accordingly, there is a demand for increasing the charging efficiency of an antenna that operates in the magnetic induction scheme and an antenna that operates in the magnetic resonance scheme when the magnetic induction scheme and the magnetic resonance scheme are simultaneously applied.

Meanwhile, in recent years, in order to provide convenience to a driver, convenience functions, such as the use and control of additional devices (for example, car audio and the like) installed in a vehicle through interworking of a portable terminal are provided. For this purpose, a vehicle is required to mount a near field communication module for communication between additional devices in the vehicle and the portable terminal.

Further, the Global System for Portable Communication (GSM) used as a communication network of a cell phone in the US, Europe and the like has a problem in that a reception rate of a signal in a vehicle is lowered. Thus, the vehicle is required to mount an antenna for amplifying a GSM signal.

However, as a communication module and an antenna for wireless charging and wireless communication are mounted in a vehicle, there are the problems that a mounting space in a vehicle becomes insufficient, and a restriction is imposed on the interior of the vehicle.

Further, when mounting an antenna for wireless charging and wireless communication in a vehicle, it is inevitable to use a structure in which a plurality of antennas are overlapped due to space limitation. In this case, if using a general antenna of the magnetic resonance scheme (for example, an antenna of the A4WP that is the magnetic resonance wireless power transmission association), there is a problem that a region that cannot be charged due to the interference of the magnetic induction antenna and cannot be charged in the charging region (i.e., a Null Point) exists.

DISCLOSURE

Technical Problem

The present disclosure is proposed to solve the above problems of the related art, and an object of the present disclosure is to provide an antenna module for a vehicle that can stack an antenna for a magnetic resonance wireless power transmission and near field communication and an antenna for a magnetic induction wireless power transmission to be partially overlapped with each other, thus performing wireless power transmission function with respect to a portable terminal equipped with a magnetic resonance wireless power transmission function and a portable terminal equipped with the magnetic induction wireless power transmission function in one module.

Further, another object of the present disclosure is to provide the antenna module for the vehicle that performs the magnetic resonance wireless power transmission and near field communication using one antenna, thus minimizing the thickness of the antenna module.

Further, another object of the present disclosure is to provide the antenna module for the vehicle that stacks an antenna for a mobile communication frequency to amplify a signal of the mobile communication frequency band in the vehicle.

Further, another object of the present disclosure is to provide the antenna module for the vehicle that can simultaneously locate at least two antennas for wireless power transmission having different wireless power transmission schemes, thus performing wireless power transmission using all of the magnetic induction scheme and the magnetic resonance scheme.

Further, another object of the present disclosure is to provide the antenna module for the vehicle in which the antenna operating in the magnetic induction scheme can be configured to include all of a Qi type antenna and a PMA type antenna to use all of the Qi type, the PMA type, and the magnetic resonance scheme in one module.

Technical Solution

For achieving the objects, an antenna module for a vehicle in accordance with an embodiment of the present disclosure includes a base sheet; a first antenna unit having a first antenna and stacked on one surface of the base sheet; and a second antenna unit having a second antenna at least partially overlapped with the first antenna, and stacked on one surface of the first antenna unit.

The second antenna can include a first wireless power transmission antenna formed in a loop shape wound around a winding axis; and a second wireless power transmission antenna spaced apart from the first wireless power transmission antenna, and formed in a loop shape wound around another winding axis. In this case, the first wireless power transmission antenna can be overlapped with a part of the first antenna, and the second wireless power transmission antenna can be overlapped with another part of the first antenna, one of the first wireless power transmission antenna and the second wireless power transmission antenna can be the Qi type antenna, and the other can be the PMA type antenna.

Meanwhile, in the antenna module for the vehicle in accordance with an embodiment of the present disclosure, the second antenna can further include a third wireless power transmission antenna, and the third wireless power transmission antenna can be formed in a loop shape wound around a winding axis that is spaced apart from winding axes of the first wireless power transmission antenna and the second wireless power transmission antenna. In this case, the third wireless power transmission antenna can have one side overlapped with the first wireless power transmission antenna, have the other side overlapped with the second wireless power transmission antenna, and be at least partially overlapped with the first antenna.

Herein, the winding axes of the first wireless power transmission antenna to the third wireless power transmission antenna are not overlapped with each other, at least one of the first wireless power transmission antenna to the third wireless power transmission antenna can be the Qi type antenna, and the remainder can be the PMA type antenna.

The first antenna can include an internal antenna having a plurality of loop shapes that wind a plurality of winding axes spaced apart from each other, respectively, and an external antenna connected to the internal antenna, and having a loop shape wound along an outer circumference of the entire internal antenna. In this case, the first wireless power transmission antenna and the second wireless power transmission antenna are overlapped with one of the winding axes having the plurality of loop shapes of the internal antenna, respectively.

The antenna module for the vehicle in accordance with the embodiment of the present disclosure can include a magnetic sheet stacked on the other surface of the base sheet, and the magnetic sheet can be formed of a material in which the region overlapping the first antenna unit and the region overlapping the second antenna unit are different from each other.

The antenna module for the vehicle in accordance with the embodiment of the present disclosure can further include a third antenna unit formed with a third antenna, and stacked on one surface of the second antenna unit.

In this case, the third antenna unit can include a first terminal formed on one surface of a substrate; a first antenna pattern having one end connected with the first terminal, and formed along an outer circumferential portion of one surface of the substrate; a second terminal spaced apart from the first terminal and formed on one surface of the substrate; and a second antenna pattern having one end connected with the second terminal, formed along an outer circumferential portion of one surface of the substrate, and having the other end spaced apart from the other side of the first antenna pattern.

Advantageous Effects

In accordance with the present disclosure, there is the effect in that an antenna module for a vehicle can stack an antenna for a magnetic resonance wireless power transmission and a near field communication and an antenna for a magnetic induction wireless power transmission to be partially overlapped with each other, thus performing wireless power transmission with respect to a portable terminal equipped with the magnetic resonance wireless power transmission function and a portable terminal equipped with the magnetic induction wireless power transmission function in one antenna module.

Further, there is the effect in that the antenna module for the vehicle can perform a magnetic resonance wireless power transmission and near field communication using one antenna stacked on a base sheet, thus minimizing the thickness of the antenna module.

Further, there is the effect in that the antenna module for the vehicle can stack an antenna for a portable communication frequency thus amplifying a signal of the portable communication frequency band in a vehicle and maximizing a reception rate of the mobile communication terminal.

Further, there are the effects in that the antenna module for the vehicle can simultaneously locate at least two antennas for wireless power transmission having different wireless power transmission schemes, thus performing wireless power transmission using all of the magnetic induction scheme and the magnetic resonance scheme; and using all of the Qi type, the PMA type, and the magnetic resonance scheme to enhance compatibility and ease of use.

MODE FOR INVENTION

Figure 1:
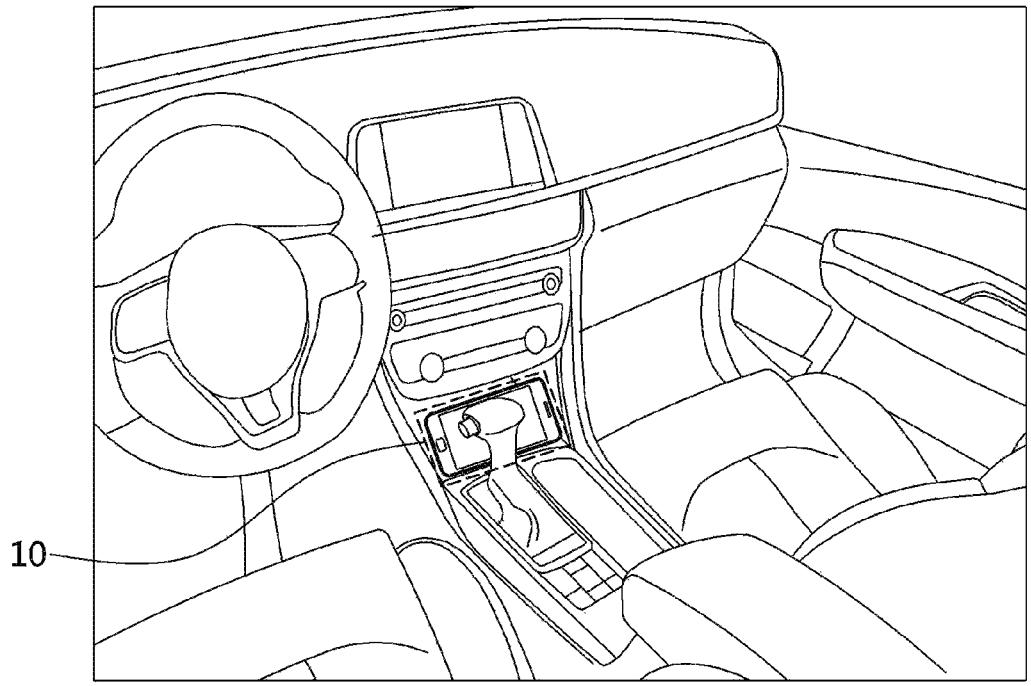
FIGS. 1 and 2 are views explaining an antenna module for a vehicle in accordance with an embodiment of the present disclosure.

Hereinafter, for detailed explanation to the extent that a person skilled in the art to which the present disclosure pertains can easily embody the technical spirit of the present disclosure, the most preferred embodiments of the present disclosure will be described in detail with reference to the accompanying drawings. First, it should be noted that in denoting reference numerals to the elements in each drawing, the same elements have the same reference numerals if possible even though illustrated in different drawings. Further, in explaining the present disclosure, detailed description of related known configurations and functions will be omitted if it obscures the subject matter of the present disclosure.

An antenna module for a vehicle in accordance with an embodiment of the present disclosure is mounted within a vehicle and performs the transmission/reception of a signal for the charging of a portable terminal and near field communication between the portable terminal and additional devices in the vehicle. As one example, referring to FIG. 1, the antenna module for the vehicle is mounted in a space 10 between a center fascia and a gear knob of the vehicle.

In this case, the antenna module for the vehicle stacks an antenna performing a magnetic resonance wireless power transmission and near field communication and an antenna performing a magnetic induction wireless power transmission to be partially overlapped with each other.

Thus, the antenna radiation is increased by the coupling effect between the antenna performing the magnetic resonance wireless power transmission and an antenna performing the magnetic induction wireless power transmission.

Herein, the coupling is the phenomenon that the energy is delivered between two or more circuits or systems, and is composed of two or more circuits that are electromagnetically or alternately coupled by applying a current coupled circuit to perform the energy exchange.

The antenna module for the vehicle stacks the antenna performing the magnetic induction wireless power transmission on the antenna performing the magnetic resonance wireless power transmission, and transmits the energy using the magnetic field generated by the current flowing on two coil circuits by the inductive coupling.

Figure 2:
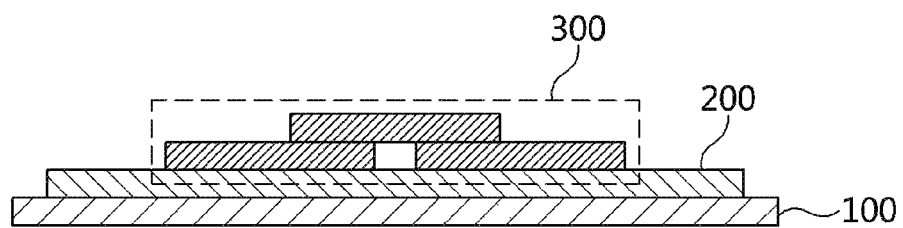

For this purpose, as illustrated in FIG. 2, the antenna module for the vehicle is configured to include a base sheet 100, a first antenna unit 200, and a second antenna unit 300.

The base sheet 100 is composed of a circuit substrate made of a synthetic resin, such as polyimide (PI) and PET. In this case, the base sheet 100 can be composed of a PCB having a predetermined strength, a FPCB having ductility and the like.

The first antenna unit 200 includes an antenna that is formed on one surface of the base sheet 100 and performs wireless power transmission and near field communication. That is, the first antenna unit 200 includes an antenna that operates as an antenna for wireless power transmission transmitting wireless power in the magnetic resonance scheme and near field communication.

Figure 3:
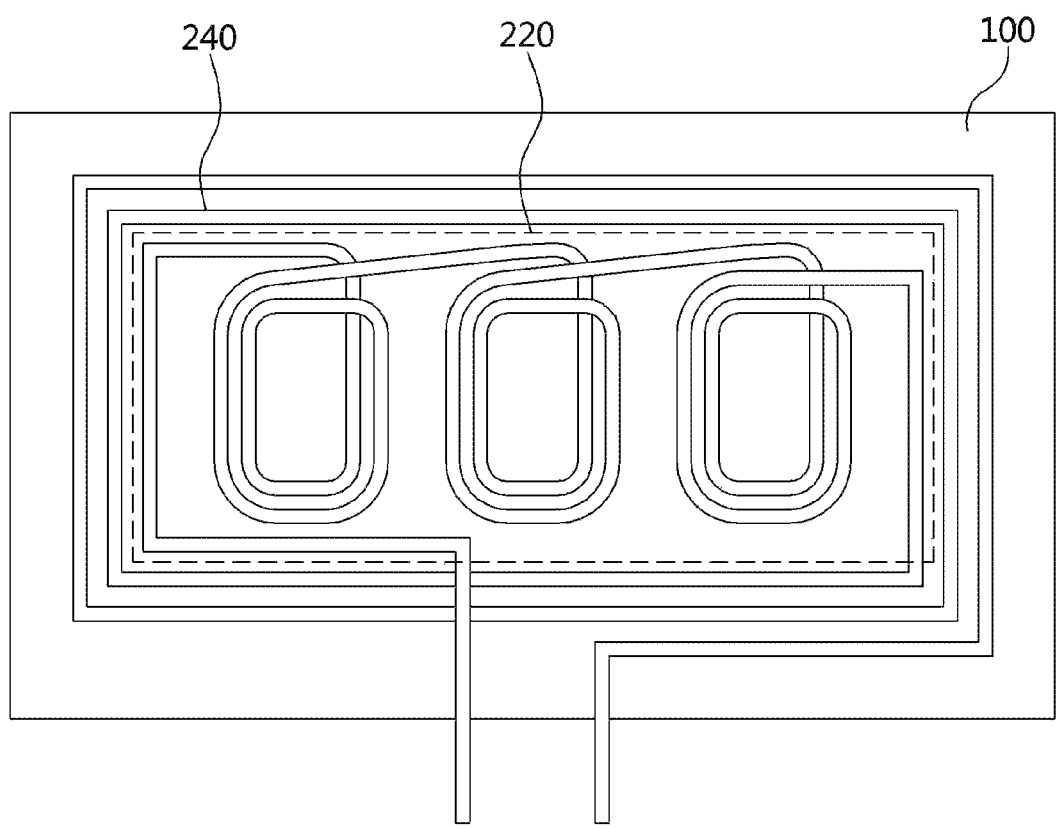
FIG. 3 is a view explaining a first antenna unit of FIG. 2.

As one example, as illustrated in FIG. 3, the first antenna unit 200 is configured to include an internal antenna 220 and an external antenna 240 through which a conductive member (for example, a wire) having a predetermined thickness is wound.

The internal antenna 220 is formed to have a plurality of loop shapes winding a plurality of winding axes spaced apart from each other, respectively. That is, the internal antenna 220 is composed of a plurality of flat-type coils connected to each other. In this case, the flat-type coil is formed in a circular shape, an elliptical shape, a square shape, and the like by winding the conductive member around the winding axis plural times. Herein, the internal antenna 220 is located to be partially overlapped with an antenna formed on the second antenna unit 300 described later.

The external antenna 240 is connected to the internal antenna 220, and formed in a loop shape wound along an outer circumference of the entire internal antenna 220. That is, the external antenna 240 is composed of a predetermined shape of the flat-type coil plural times wound around the region in which the internal antenna 220 is formed.

The internal antenna 220 and the external antenna 240 can be composed of one conductive member, or composed of each independent conductive member, and then also connected with each other through another conductive member.

The first antenna unit 200 operates as an antenna for A4WP that transmits wireless power in the magnetic resonance scheme in the operating frequency band of 6.765 to 6.795 MHz through a combination of the internal antenna 220 and the external antenna 240, or as an antenna for NFC that communicates with a portable terminal in the frequency band of 13.56 MHz.

Meanwhile, the first antenna unit 200 can be formed by patterning a conductor, such as a copper foil, into a loop shape on one surface of the base sheet 100, or printing a loop shape of a metal pattern using a conductive ink or a conductive paste.

Of course, the first antenna unit 200 can be also composed of the shape that combines a flat-type coil plural times wound by a conductive member with an antenna printed on one surface of the base sheet 100. Herein, the first antenna unit 200 can be also composed of an antenna having a shape that is defined by the magnetic resonance wireless power transmission association.

Figure 4:
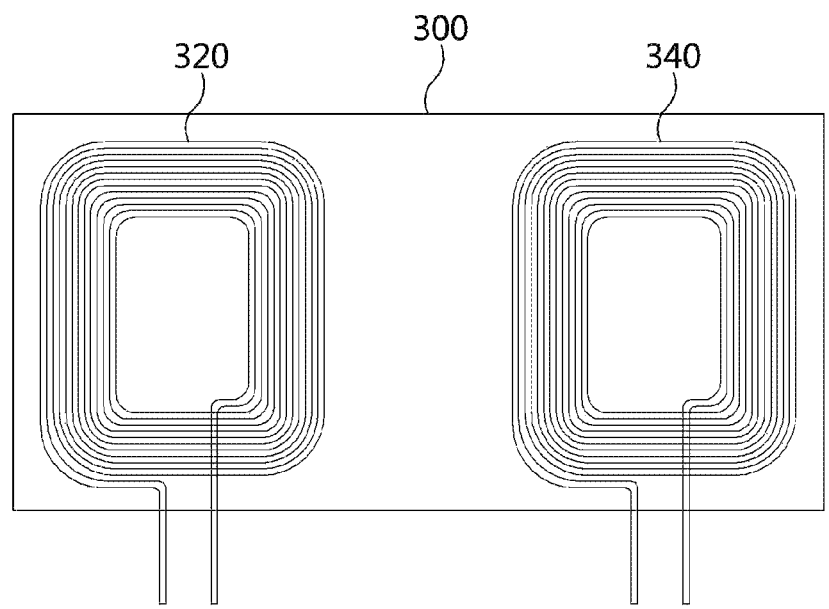
FIGS. 4 and 5 are views explaining a second antenna unit of FIG. 2.

The second antenna unit 300 is stacked on one surface of the first antenna unit 200. The second antenna unit 300 can be, for example, an antenna that transmits the wireless power in the magnetic induction scheme, and as illustrated in FIG. 4, configured to include a first wireless power transmission antenna 320 and a second wireless power transmission antenna 340.

The first wireless power transmission antenna 320 and the second wireless power transmission antenna 340 are spaced at a predetermined interval apart from each other so as to overlap a predetermined region of an antenna (for example, the internal antenna 220) formed in the first antenna unit 200.

The first wireless power transmission antenna 320 is formed in a loop shape wound around a winding axis. In this case, the first wireless power transmission antenna 320 is overlapped with a part of the first antenna unit 200.

The second wireless power transmission antenna 340 is formed in a loop shape wound around a winding axis different from that of the first wireless power transmission antenna 320. In this case, the second wireless power transmission antenna 340 is overlapped with another part of the first antenna unit 200.

The first wireless power transmission antenna 320 and the second wireless power transmission antenna 340 can be composed of a Qi type antenna or a PMA type antenna operating in the magnetic induction scheme in the operating frequency band of about 100 to 350 kHz.

Herein, one of the first wireless power transmission antenna 320 and the second wireless power transmission antenna 340 can be composed of the Qi type antenna, and the other can be composed of the PMA type antenna.

Of course, at least one of the first wireless power transmission antenna 320 or the second wireless power transmission antenna 340 can be also composed of an antenna that can be used by integrating the Qi type and the PMA type.

In this case, the first wireless power transmission antenna 320 or the second wireless power transmission antenna 340 can be overlapped with one of the winding axes having a plurality of loop shapes of the internal antenna 220, respectively. Herein, the overlapping winding axis means that the winding axis is located to overlap in the entire region of the first wireless power transmission antenna 320 or the second wireless power transmission antenna 340.

Figure 5:
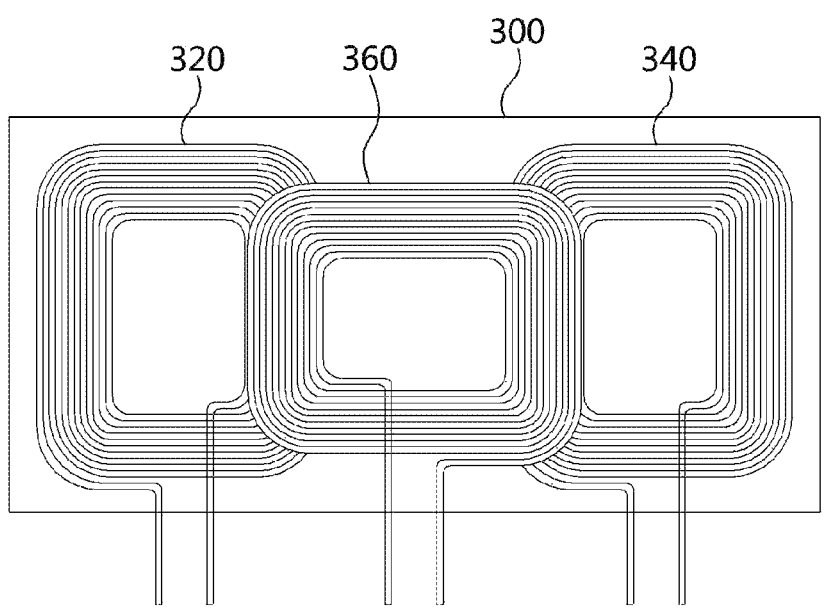

Meanwhile, as illustrated in FIG. 5, the second antenna unit 300 can be configured to further include a third wireless power transmission antenna 360 that is located to be partially overlapped with the first wireless power transmission antenna 320 and the second wireless power transmission antenna 340.

The third wireless power transmission antenna 360 can be formed in a loop shape wound around a winding axis that is spaced apart from the winding axes of the first wireless power transmission antenna 320 and the second wireless power transmission antenna 340.

The third wireless power transmission antenna 360 has a predetermined region overlapped with the first wireless power transmission antenna 320 and the second wireless power transmission antenna 340. In this case, the third wireless power transmission antenna 360 has one side overlapped with the first wireless power transmission antenna 320, and the other side overlapped with the second wireless power transmission antenna 340. The winding axes of the first wireless power transmission antenna 320 to the third wireless power transmission antenna 360 are formed not to be overlapped with each other. At least one of the first wireless power transmission antenna 320 to the third wireless power transmission antenna 360 can be the Qi type antenna, and the remainder can be the PMA type antenna.

The third wireless power transmission antenna 360 can be located to overlap a predetermined region of an antenna (for example, the internal antenna 220) formed in the first antenna unit 200.

Herein, the first wireless power transmission antenna 320 to the third wireless power transmission antenna 360 can be formed in a flat-type coil wound by a conductive member, respectively, or configured by patterning a conductor, such as a copper foil, into a loop shape or forming a loop shape of a metal pattern using a conductive ink or a paste.

Of course, the first wireless power transmission antenna 320 to the third wireless power transmission antenna 360 can be also composed of the shape that combines a flat-type coil wound by a conductive member plural times with an antenna printed on one surface of the base sheet 100.

Thus, the antenna module for the vehicle can include the first antenna unit 200 and the second antenna unit 300 operating in the magnetic induction scheme and the magnetic resonance scheme, respectively, thus performing all of two schemes (i.e., the magnetic induction scheme and the magnetic resonance scheme) of wireless power transmissions in one module.

Further, the antenna module for the vehicle can be installed in the vehicle, and perform the wireless power transmission using all of the Qi type, the PMA type, and the A4WP type having different operating frequencies or operating schemes. Accordingly, the antenna module for the vehicle can perform wireless power transmission (i.e., the charging) using a matched antenna regardless of whether the wireless power transmission scheme of portable terminals, such as a portable phone, a PDA and a tablet, to be charged is the magnetic induction scheme or the magnetic resonance scheme, thus performing the charging by all schemes of wireless power transmission without the need to replace a wireless power transmission module installed in the vehicle.

Further, the antenna module for the vehicle can perform near field communication through the first antenna unit 200, thus functioning as a complex antenna that performs the near field data communication as well as the magnetic induction wireless power transmission and the magnetic resonance wireless power transmission.

Figure 6:
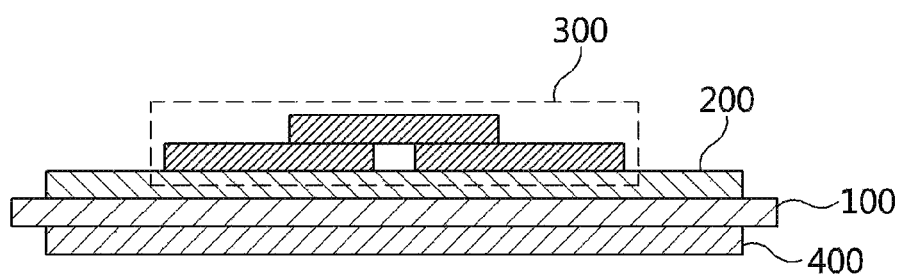
FIG. 6 is a view explaining a modification example of the antenna module for the vehicle in accordance with the embodiment of the present disclosure.

As illustrated in FIG. 6, the antenna module for the vehicle can be also configured to further include a magnetic sheet 400. That is, the antenna module for the vehicle can also stack the magnetic sheet 400 of a magnetic material on a lower surface of the base sheet 100.

The antenna module for the vehicle is configured to further include the magnetic sheet 400 in order to prevent other components from being affected by the electromagnetic wave interference.

The antenna is often in proximity to a metal material or components, and the metal changes a Self-Resonant Frequency (SRF) of an antenna coil to worsen the loss and lower the inductance of the antenna coil, eventually resulting in communication failure.

The reason for the above phenomenon stems from an eddy current generated in the metal due to the magnetic field, and in order to remove the eddy current, the magnetic sheet 400 having appropriate permeability, loss, and thickness, which interposes a high permeability and resistant material between the metal and the antenna to adjust lines of magnetic force, is used.

The eddy current loss represents power loss by the eddy current generated by an inductive electromotive force. Referring to Equation 1 below, the eddy current loss is proportional to a flux density, a frequency, and a thickness of a sheet. Herein, since it is a function of the frequency, performance of the magnetic sheet 400 suitable for different frequencies of magnetic resonance, magnetic induction, GSM, and NFC is required.

$$P_{e(eddy\ current\ loss)} = \frac{\pi^2 B^2 f^2 d^2}{C_p} \quad \text{Equation 1}$$

Herein, $P_e$ means eddy current loss, B means a flux density, f means a frequency, d means a thickness of a sheet, and $C_p$ means a power coefficient (constant).

Referring to Equation 2 below, since the magnetic field has a proportional relation with a permeability rate, the higher the permeability rate, the larger the flux density.

$$\overline{B} = \mu \overline{H} \quad \text{Equation 2}$$

Herein, µ means a permeability rate and H means a magnetic field intensity.

When an AC magnetic field is applied to ferrite, a moving speed or a magnetization rotation speed of the ferrite follows a changing magnetic field in the low frequency. However, as the frequency increases, a magnetic wall does not follow the change of the magnetic field, so that the permeability rate is lowered and the loss occurs. That is, a phase between the magnetic field (H) and the flux density (B) is delayed; as in Equation 3 below, the permeability rate can be represented as the real number part (u') and the imaginary number part (u"), as in Equation 4 below, magnetic loss (or the permeability loss rate (tan δ)) can be represented, and the larger the imaginary number part, the larger the loss.

$$\mu = B/H = |\mu| e^{-i} = \mu' - i\mu'' \quad \text{Equation 3}$$

$$\tan \delta = \mu''/\mu' (\text{loss tangent}) \quad \text{Equation 4}$$

Herein, the experimental result shows that the specification of the magnetic sheet 400 should be u'>50 at a minimum and u"<5 or lower in the frequencies of 100 kHz to 350 kHz, 6.78 MHz, or 13.56 MHz.

In this case, the magnetic sheet 400 shields the magnetic field generated in antennas formed on the first antenna unit 200 and the second antenna unit 300, thus preventing the external leakage.

Further, the magnetic sheet 400 converges the magnetic field in one side direction to enhance the characteristic of the corresponding antenna. That is, the magnetic sheet 400 shields the magnetic field generated upon transmitting a wireless signal of a predetermined frequency band from the antennas, thus increasing the convergence of the magnetic field in one side direction to enhance the characteristic of the antenna operating in the predetermined frequency band.

For this purpose, the magnetic sheet 400 can be composed of a magnetic material that can shield the magnetic field, and formed in a plate-shape having a certain area. As one example, the magnetic sheet 400 is made of a material, such as a ribbon sheet, a ferrite sheet, or a polymer sheet and the like of an amorphous alloy or a nano-crystalline alloy. Herein, the ferrite sheet can be a sintered ferrite sheet; a Ni—Zn ferrite or a Mn—Zn ferrite can be used; and a ferrite containing Mg can be also used. An amorphous alloy or a nano-crystalline alloy can use a Fe-based or a Co-based magnetic alloy. The polymer sheet can be a Fe—Si—Al-based metal polymer or a Fe—Si—Cr-based metal polymer.

Figure 7:
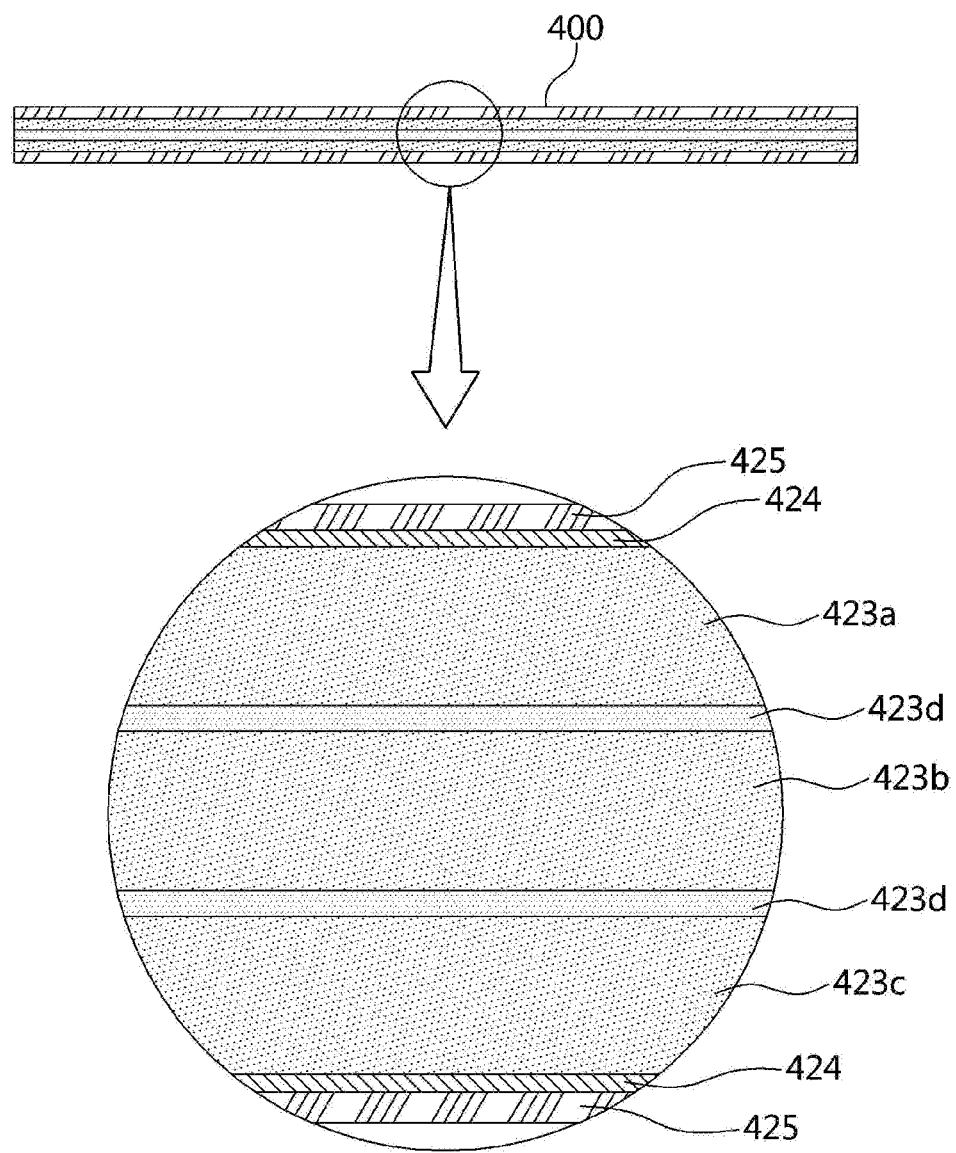
FIGS. 7 to 11 are views explaining a magnetic sheet of FIG. 6.

Meanwhile, as illustrated in FIG. 7, the magnetic sheet 400 can be also composed of the shape that stacks ribbon sheets 423a, 423b, 423c of a plurality of amorphous alloys or nano-crystalline alloys.

The magnetic sheet 400 can be separated and formed into a plurality of microstructures in order to suppress the eddy current by increasing the resistance, and the plurality of microstructures can be configured to be overall insulated between the adjacent microstructures or to be partially insulated therebetween. In this case, the plurality of microstructures can be composed of a size of about 1 m to 3 mm, and each microstructure can be atypically, randomly, composed.

The magnetic sheet 400 can be provided with an adhesive layer 423d made of non-conductive material that is interposed between each of the sheets 423a, 423b, 423c, if the plurality of sheets 423a, 423b, 423c separated and formed into a microstructure are stacked.

The adhesive layer 423d can also function as insulating the plurality of microstructures constituting each of the sheets 423a, 423b, 423c by allowing the adhesive layer 423d to be permeate between a pair of sheets 423a, 423b, 423c stacked on each other. Herein, the adhesive layer 423d can be composed of a glue, and composed of the shape on which the glue is applied to one surface or both surfaces of a substrate of a film shape.

The magnetic sheet 400 can further include a protection film 425 that is formed on the uppermost portion and the lowermost portion of the laminate on which the plurality of sheets 423a, 423b, 423c are stacked. In this case, the protection film 425 is adhered to the laminate by an adhesive layer 424.

The magnetic sheet 400 can be formed to have the saturation flux density of 0.35 Tesla or more in the frequency bands of about 100 kHz to 350 kHz, 6.765 MHz to 6.795 MHz, and 13.56 MHz in which the first antenna unit 200 and the second antenna unit 300 operate.

This is because as the saturation flux density of the magnetic sheet 400 is higher, the saturation due to the magnetic field is delayed, so that a thinner thickness can be used compared to a shielding sheet having a lower saturation flux density.

Further, the magnetic sheet 400 can be made of a material that the permeability loss rate (Tan δ (=µ"/µ')) is 0.05 or less in the frequency bands of about 100 kHz to 350 kHz, 6.765 MHz to 6.795 MHz, and 13.56 MHz in which the first antenna unit 200 and the second antenna unit 300 operate (µ' means the permeability rate, and µ" means the permeability loss).

Figure 8:
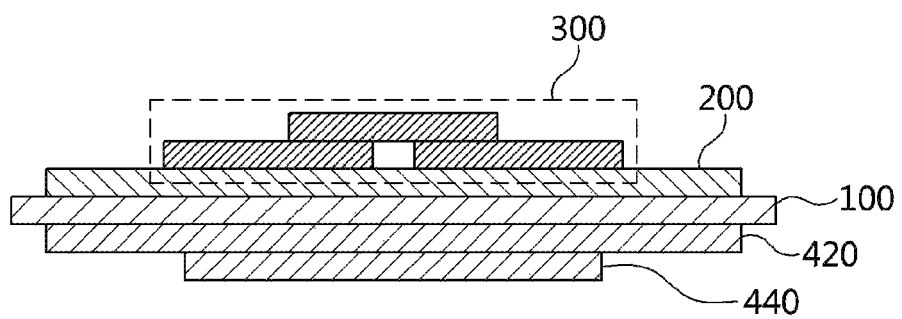
Figure 9:
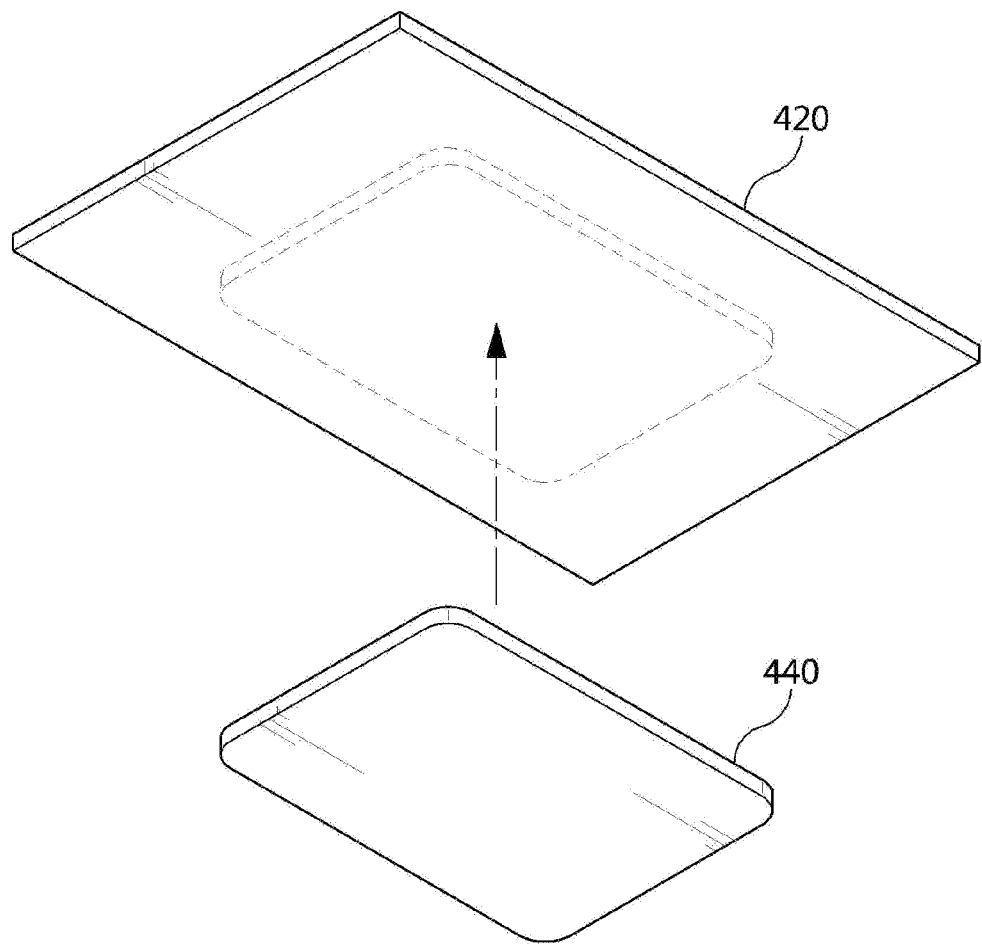

Meanwhile, the magnetic sheet 400 can be formed of a material different from the region overlapping the first antenna unit 200 and the region overlapping the second antenna unit 300. That is, as illustrated in FIGS. 8 and 9, the magnetic sheet 400 can be also composed of a first magnetic sheet 420 and a second magnetic sheet 440 having different characteristics in order to enhance the characteristics of the antennas, respectively, formed on the antenna modules corresponding to the first antenna unit 200 and the second antenna unit 300 operating in different frequency bands.

That is, the magnetic sheet 400 can be composed of the first magnetic sheet 420 and the second magnetic sheet 440 having different characteristics in the predetermined frequency band in order to enhance the characteristics of the first antenna unit 200 operating in the magnetic resonance scheme (i.e., A4WP) and near field communication (i.e., NFC) and the second antenna unit 300 operating in the magnetic induction scheme (i.e., WPC), respectively.

In this case, the antenna module for the vehicle can also include a protection sheet (not shown) that is attached to at least one surface of the magnetic sheet 400 to protect the magnetic sheet 400.

Specifically, the first magnetic sheet 420 is located in the region corresponding to the first antenna unit 200 operating as the magnetic resonance wireless power transmission antenna and the near field communication antenna in the high frequency band. The second magnetic sheet 440 is located in the region corresponding to the second antenna unit 300 operating as the magnetic induction wireless power transmission antenna in the low frequency band.

Herein, the first magnetic sheet 420 is configured to have the area including the first antenna unit 200, and the second magnetic sheet 440 is configured to have the area including the second antenna unit 300.

In this case, the second magnetic sheet 440 is configured to have a relatively narrower area than the first magnetic sheet 420 and to be stacked on one surface (i.e., a lower surface) of the first magnetic sheet 420.

Figure 10:
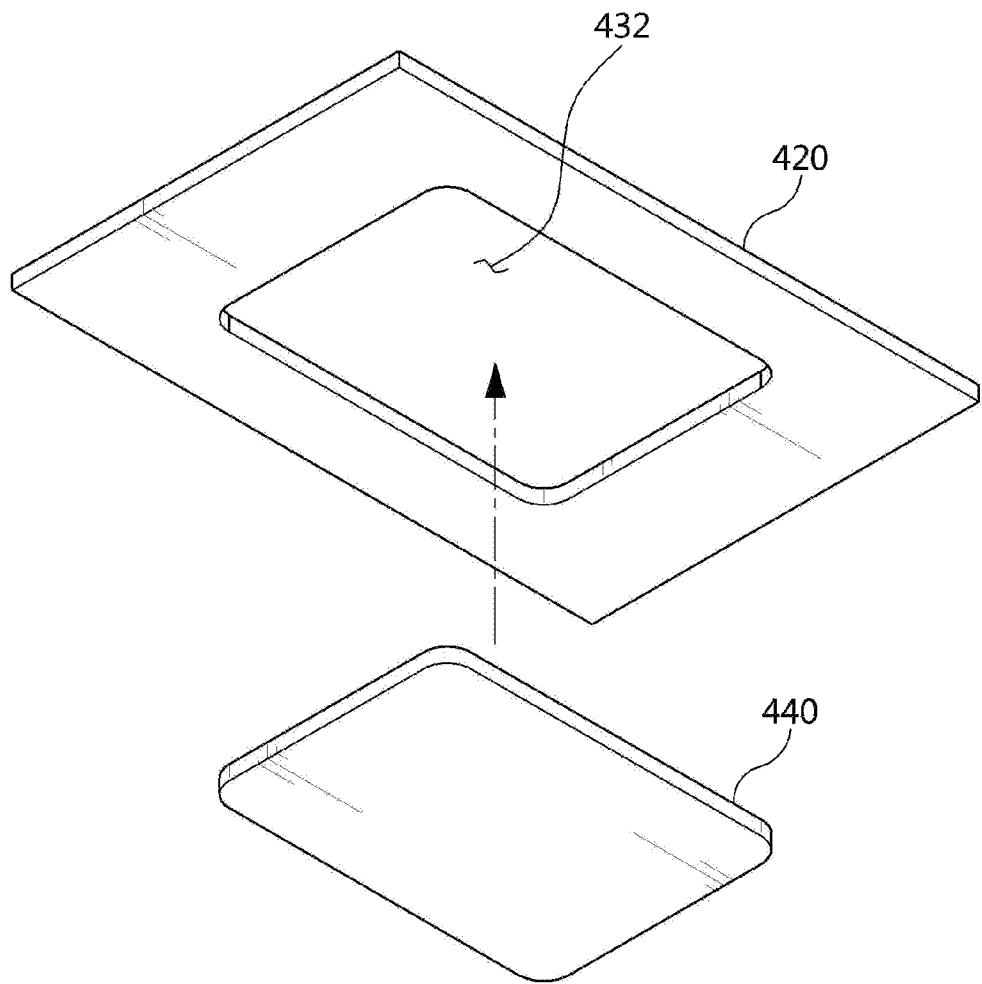

Referring to FIG. 10, the first magnetic sheet 420 can be formed with a receiving portion 430 receiving the second magnetic sheet 440. In this case, the receiving portion 430 is formed in the shape of a through-hole penetrating the first magnetic sheet 420, and the second magnetic sheet 440 is inserted therein.

Figure 11:
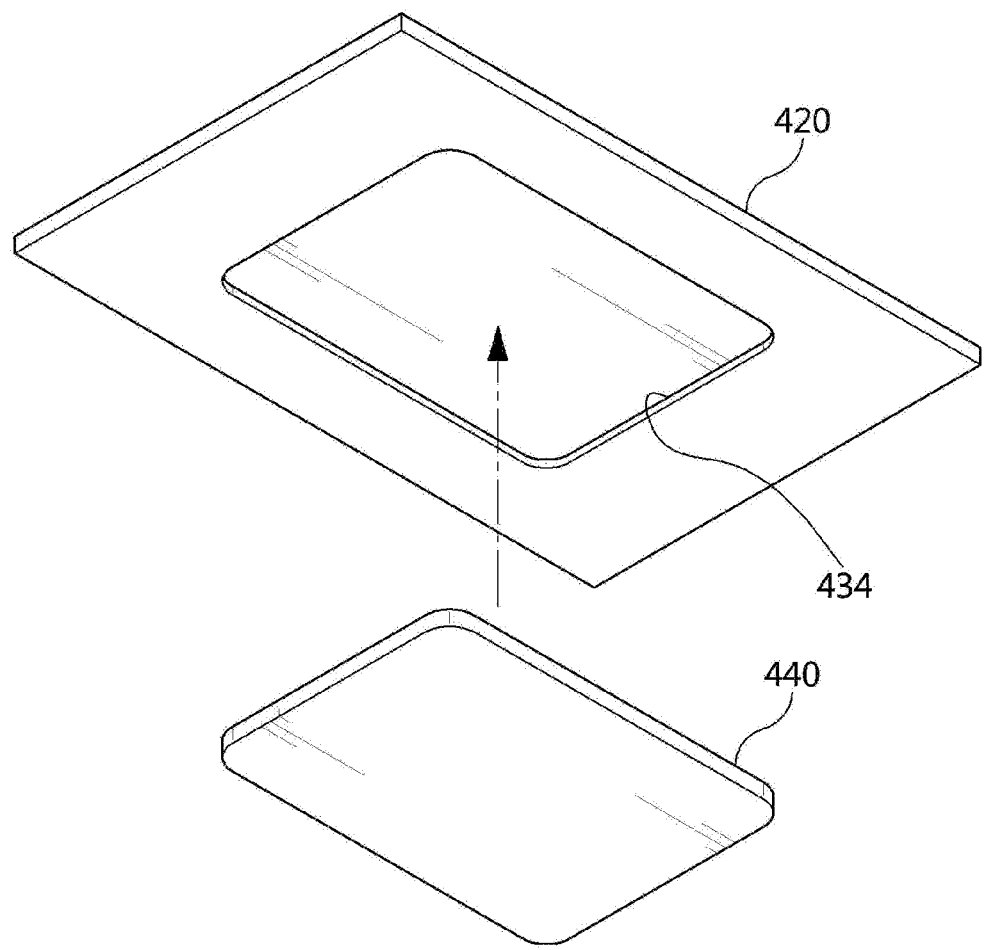

Of course, referring to FIG. 11, the first magnetic sheet 420 can be formed with a receiving groove 434 in which the second magnetic sheet 440 is seated. The receiving groove 434 can be recessed at a certain depth from one surface of the first magnetic sheet 420, and the second magnetic sheet 440 can be also seated in the receiving groove 434.

The first magnetic sheet 420 and the second magnetic sheet 440 can be also configured to have different permeability rates or different saturation magnetic fields in the predetermined frequency band, and if the permeability rates of the first magnetic sheet 420 and the second magnetic sheet 440 in the predetermined frequency band are the same, also to have different permeability loss rates.

Specifically, the second magnetic sheet 440 can be formed to have a relatively higher permeability rate than the first magnetic sheet 420 in the low frequency band of 100 to 350 kHz, or to have a relatively larger saturation magnetic field than the first magnetic sheet 420.

Of course, if the first magnetic sheet 420 and the second magnetic sheet 440 have the same permeability rate in the frequency band of 100 to 350 kHz, the permeability loss rate of the second magnetic sheet 440 is a relatively smaller than the permeability loss rate of the first magnetic sheet 420.

Herein, the second magnetic sheet 440 can be made of a material that has the permeability rate of 300 to 3500, the permeability loss rate (Tan $\delta$ (=$\mu''/\mu'$)) of 0.05 or less, and the saturation flux density of 0.25 T or more in the low frequency band of 100 to 350 kHz.

As one example, the second magnetic sheet 440 can be made of a Mn—Zn ferrite that has the permeability rate of 2000 to 3500 and the permeability loss rate (Tan $\delta$ (=$\mu''/\mu'$)) of 0.05 or less in the frequency band of 100 kHz to 350 kHz, and of a Ni—Zn ferrite that has the permeability rate of 300 to 1500 and the permeability loss rate (Tan $\delta$ (=$\mu''/\mu'$)) of 0.05 or less in the frequency band of 100 kHz to 350 kHz.

Meanwhile, the first magnetic sheet 420 can be formed to have a relatively higher permeability rate than the second magnetic sheet 440 in the high frequency band of 6.765 MHz to 6.795 MHz and 13.56 MHz, or in case of having the same permeability rate as the second magnetic sheet 440, also to have a relatively lower permeability loss rate than the second magnetic sheet 440.

Herein, the first magnetic sheet 420 can be made of a material that has the permeability rate of 30 to 350, the permeability loss rate (Tan $\delta$ (=$\mu''/\mu'$)) of 0.05 or less, and the saturation flux density of 0.25 T or more in the operating frequencies of 6.765 MHz to 6.795 MHz and 13.56 MHz.

As one example, the first magnetic sheet 420 can be made of a Ni—Zn ferrite that has the permeability rate of 100 to 350 and the permeability loss rate (Tan $\delta$ (=$\mu''/\mu'$)) of 0.05 or less in 6.765 MHz to 6.795 MHz and 13.56 MHz, and of a metal polymer that has the permeability rate of 30 to 70 and the permeability loss rate (Tan $\delta$ (=$\mu''/\mu'$)) of 0.05 or less in 6.765 MHz to 6.795 MHz and 13.56 MHz.

This is because the second magnetic sheet 440 has a relatively higher permeability rate than the first magnetic sheet 420 in the frequency band of 100 to 350 kHz, and thus an AC magnetic field generated in the second antenna unit 300 in wireless power transmission by the magnetic induction scheme, is induced to the second magnetic sheet 440 having a relatively high permeability rate.

In this case, since the second magnetic sheet 440 is located in the region corresponding to the second antenna unit 300, the AC magnetic field induced to the second magnetic sheet 440 can be shielded by the second magnetic sheet 440 to be converged in a desired direction, thus enabling efficient transmission to the wireless power reception module.

Further, since the first magnetic sheet 420 has a relatively higher permeability rate than the second magnetic sheet 440 in 6.765 MHz to 6.795 MHz, the AC magnetic field generated from the first antenna unit 200 in the wireless power transmission by the magnetic resonance scheme is induced to the first magnetic sheet 420 having a relatively high permeability rate.

In this case, since the first magnetic sheet 420 is located in the region corresponding to the first antenna unit 200, the AC magnetic field induced to the first magnetic sheet 420 is shielded by the first magnetic sheet 420 to be converged in a desired direction, thus enabling efficient transmission to the wireless power reception module.

In addition, since the first magnetic sheet 420 has a relatively higher permeability rate than the second magnetic sheet 440 in the frequency of 13.56 MHz even in near field communication (i.e., NFC communication) through the first antenna unit 200, the magnetic field generated in data communication is also induced to the first magnetic sheet 420 having a relatively high permeability rate.

In this case, since the first magnetic sheet 420 is located in the region corresponded to the first antenna unit 200, the magnetic field induced to the first magnetic sheet 420 is shielded by the first magnetic sheet 420 to be converged in a desired direction, thus increasing transmission/reception sensitivity of data.

In addition, even if the first magnetic sheet 420 and the second magnetic sheet 440 have the same permeability rate in the frequency band of 100 to 350 kHz, if the permeability loss rate of the second magnetic sheet 440 has a relatively lower value than the permeability loss rate of the first magnetic sheet 420, the loss of the permeability rate by the permeability loss rate in the wireless power transmission is reduced as a result.

Accordingly, the AC magnetic field generated in accordance with the power transmission in the operating frequency of a range of 100 to 350 kHz is induced to the second magnetic sheet 440 having a relatively high permeability rate, thus enabling the transmission to the wireless power reception module with high efficiency through the second antenna unit 300 located in the region corresponding to the second magnetic sheet 440.

Likewise, even if the first magnetic sheet 420 and the second magnetic sheet 440 have the same permeability rate in the frequencies of 6.765 MHz to 6.795 MHz and 13.56 MHz, if the permeability loss rate of the first magnetic sheet 420 has a relatively lower value than the permeability loss rate of the second magnetic sheet 440, the loss of the permeability rate by the permeability loss rate in the wireless power transmission or the data communication is reduced as a result.

Accordingly, the magnetic field is induced to the first magnetic sheet 420 having a relatively high permeability rate in the frequencies of 6.765 MHz to 6.795 MHz and 13.56 MHz, thus transmitting the wireless power with high efficiency or increasing the transmission/reception sensitivity of data through the first antenna unit 200 located in the region corresponding to the first magnetic sheet 420.

Herein, it has been explained that the first magnetic sheet 420 is composed of a Ni—Zn ferrite or a metal polymer, and the second magnetic sheet 440 is composed of a Mn—Zn ferrite or a Ni—Zn ferrite. However, the present disclosure is not limited thereto, and it should be noted that materials of the first magnetic sheet 420 and the second magnetic sheet 440 can be variously changed as long as the permeability rate, the saturation magnetic field, and the permeability loss rate satisfy the condition relative to each sheet in the corresponding frequency band.

As one example, the first magnetic sheet 420 and the second magnetic sheet 440 can be also composed of the same materials having different permeability rates in the operating frequencies of 100 to 350 kHz, 6.765 MHz to 6.795 MHz, and 13.56 MHz, and the second magnetic sheet 440 can be also made of a ribbon sheet of an amorphous alloy or a nano-crystalline alloy. This is because even if they are made of the same material, they can be manufactured to have different characteristics (the permeability rate, the saturation magnetic field, the permeability loss rate, and the like) through various conditions, such as a thermal treatment temperature, and the number of layers.

In addition, if at least any one of the first magnetic sheet 420 and the second magnet sheet 440 is made of a ribbon sheet of an amorphous alloy or a nano-crystalline alloy, a single layer of the ribbon sheet can be also used. However, the first magnetic sheet 420 and/or the second magnetic sheet 440 can be also composed of the shape that a plurality of ribbon sheets of an amorphous alloy or a nano-crystalline alloy are stacked (referring to FIG. 7).

Meanwhile, the first magnet sheet 420 and the second magnetic sheet 440 are located so that one surface on which the first antenna unit 200 and the second antenna unit 300 are located forms a stepped surface. In this case, the stepped surface is formed so that one surface of the second magnetic sheet 440 on which the second antenna unit 300 is located is formed to protrude at a certain height from one surface of the first magnet sheet 420 on which the first antenna unit 200 is located.

This is because the separation distances from the second antenna unit 300 operating in the magnetic induction scheme to a portable terminal to be charged and from the first antenna unit 200 operating in the magnetic resonance scheme to a portable terminal to be charged are different from each other.

Generally, the closer the distance between a transmission coil mounted in the wireless power transmission module and a reception coil mounted in the wireless power reception module, the larger the value of the coupling coefficient.

In this case, the antenna operating in the magnetic resonance scheme uses the coupling coefficient (k) of less than 0.2 between the coils, and the antenna operating in the magnetic induction scheme uses the coupling coefficient (k) of more than 0.7 between the coils.

This is because since the efficiency deterioration due to split occurs to further reduce the efficiency of the wireless power transmission if the coupling coefficient between the coils in the magnetic resonance scheme is 0.2 or more, it is necessary to maintain the coupling coefficient of 0.2 or less by separating the reception coil and the transmission coil at an appropriate distance.

However, contrary to the magnetic resonance scheme, as the coupling coefficient between the coils is higher in the magnetic induction scheme, the efficiency of the wireless power transmission proportionally increases, so that it is necessary to keep the separation distance between the reception coil and the transmission coil close to each other.

Accordingly, in the embodiment of the present disclosure, the first magnetic sheet 420 and the second magnetic sheet 440 are located to form a stepped surface, and one surface of the second magnetic sheet 440 on which the second antenna unit 300 operating in the magnetic induction scheme is located is placed on a lower location than one surface of the first magnetic sheet 420 on which the first antenna unit 200 operating in the magnetic resonance scheme is located.

Thus, in case of the portable terminal transmitting the wireless power by the magnetic induction scheme, the second antenna unit 300 and the portable terminal can maintain the distance as closely as possible to maintain the coupling coefficient of 0.7 or more, thus enhancing the efficiency of the wireless power transmission.

Further, in case of the portable terminal transmitting the wireless power by the magnetic resonance scheme, the first antenna unit 200 and the portable terminal can maintain so as to be spaced at an appropriate distance apart from each other to maintain the coupling coefficient of less than 0.2, so that it is advantageous to prevent split due to an excessive coil coupling and to obtain an even magnetic field distribution, thus enhancing the efficiency of the wireless power transmission.

Figure 12:
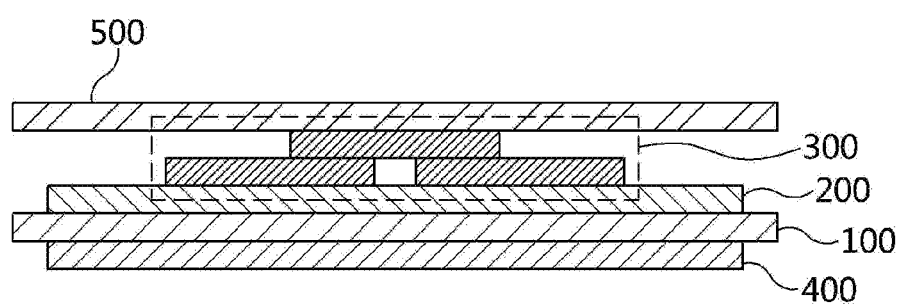
FIG. 12 is a view explaining another modification example of the antenna module for the vehicle in accordance with the embodiment of the present disclosure.

As illustrated in FIG. 12, the antenna module for the vehicle can further include a third antenna unit 500. In this case, the third antenna unit 500 is formed with an antenna for amplifying a signal of the GSM frequency band that is the mobile communication frequency band in the vehicle.

There is a problem that a reception rate of the signal in the GSM (for example, 850 MHz, 900 MHz, 1800 MHz, 1900 MHz) which is used as the frequency bands for mobile communication in the US, Europe, and the like is lowered in the vehicle.

For solving the problem, the antenna module for the vehicle is formed with an antenna transmitting/receiving the signal for mobile communication (i.e., the signal in the GSM frequency band) and stacks the third antenna unit 500 on one surface of the second antenna unit 300.

Figure 13:
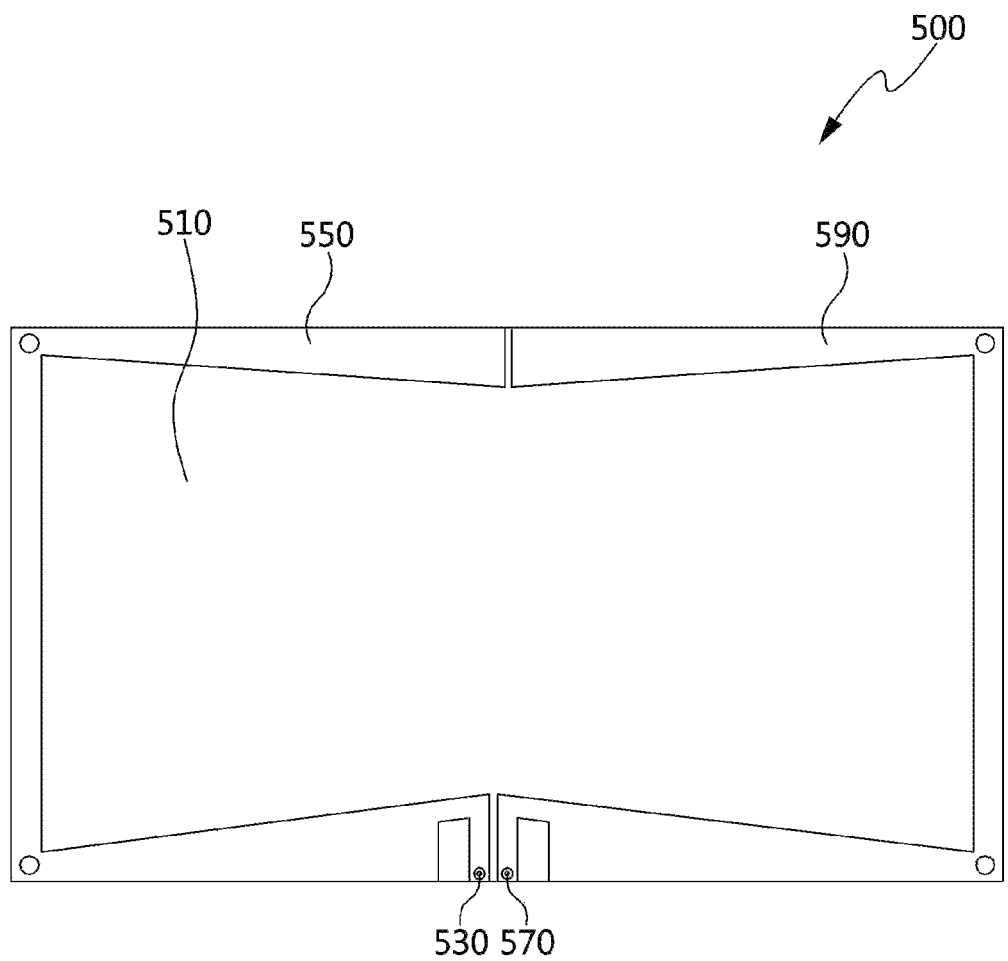
FIGS. 13 and 14 are views explaining a third antenna unit of FIG. 12.

As one example, as illustrated in FIG. 13, the third antenna unit 500 forms the antenna by patterning a conductor, such as a copper foil, on one surface of a circuit substrate 510 (for example, a PCB, a FPCB, and the like) made of a synthetic resin, such as polyimide (PI) and PET, or using a conductive ink or a paste.

In this case, the antenna can be configured to include a first antenna pattern 550 formed in a predetermined shape along an outer circumferential portion of one surface of the circuit substrate starting from a first terminal 530 formed on one side of one surface of the circuit substrate, and a second antenna pattern 590 formed symmetrically with the first antenna pattern 550 starting from a second terminal 570.

Herein, the antenna is not formed on a central portion overlapped with the antennas formed on the first antenna unit 200 and the second antenna unit 300 in order to prevent the signal interference with the first antenna unit 200 and the second antenna unit 300.

Figure 14:
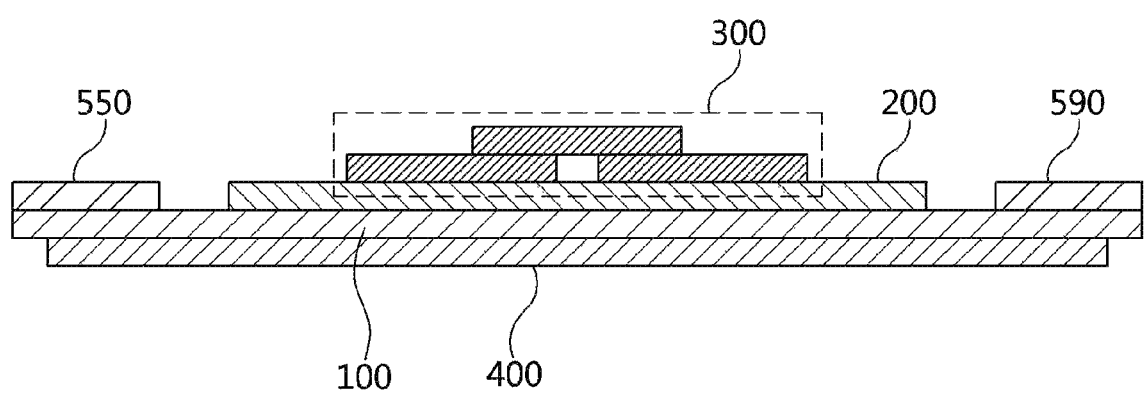

Meanwhile, as illustrated in FIG. 14, the antenna module for the vehicle does not constitute the third antenna unit 500 as a separate sheet, and can also form the antenna for mobile communication on one surface of the base sheet 100. That is, the antenna module for the vehicle can also form the first antenna unit 200 and the antenna for mobile communication on the same surface of the base sheet 100.

While the present disclosure has been described with respect to the specific embodiments, it will be apparent to those skilled in the art that various changes and modifications may be made without departing from the spirit and scope of the disclosure as defined in the following claims.

The invention claimed is:

1. An antenna module for a vehicle, comprising:
   a base sheet;
   a first antenna unit having a first antenna and stacked on one surface of the base sheet; and
   a second antenna unit having a second antenna at least partially overlapped with the first antenna, and stacked on one surface of the first antenna unit,
   wherein the second antenna comprising a first wireless power transmission antenna formed in a loop shape wound around a winding axis, and a second wireless power transmission antenna spaced apart from the first wireless power transmission antenna, and formed in a loop shape wound around another winding axis, and
   wherein the first antenna comprising an internal antenna having a plurality of loop shapes that wind a plurality of winding axes spaced apart from each other, respectively, and an external antenna connected to the internal antenna, and having a loop shape wound along an outer circumference of the internal antenna.

2. The antenna module for the vehicle according to claim 1,
   wherein the first wireless power transmission antenna is overlapped with a part of the first antenna, and the second wireless power transmission antenna is overlapped with another part of the first antenna.

3. The antenna module for the vehicle according to claim 1,
   wherein one of the first wireless power transmission antenna and the second wireless power transmission antenna is a Qi type antenna, and the other is a PMA type antenna.

4. The antenna module for the vehicle according to claim 1,
   wherein the second antenna further comprises a third wireless power transmission antenna, and wherein the third wireless power transmission antenna is formed in a loop shape wound around a winding axis that is spaced apart from winding axes of the first wireless power transmission antenna and the second wireless power transmission antenna.

5. The antenna module for the vehicle according to claim 4,
   wherein the third wireless power transmission antenna has one side overlapped with the first wireless power transmission antenna, and has the other side overlapped with the second wireless power transmission antenna.

6. The antenna module for the vehicle according to claim 5,
   wherein the third wireless power transmission antenna is at least partially overlapped with the first antenna.

7. The antenna module for the vehicle according to claim 5,
   wherein the winding axes of the first wireless power transmission antenna, the second wireless power transmission antenna and the third wireless power transmission antenna are not overlapped with each other.

8. The antenna module for the vehicle according to claim 5,
   wherein at least one of the first wireless power transmission antenna to the third wireless power transmission antenna is a Qi type antenna, and the remainder is a PMA type antenna.

9. The antenna module for the vehicle according to claim 1,
   wherein echo of the first wireless power transmission antenna and the second wireless power transmission antenna is overlapped with one of the winding axes of the plurality of loop shapes of the internal antenna.

10. The antenna module for the vehicle according to claim 1, further comprising a magnetic sheet stacked on the other surface of the base sheet,
    wherein the magnetic sheet is formed such that a material of the region overlapping the first antenna unit is different from a material of the region overlapping the second antenna unit.

11. The antenna module for the vehicle according to claim 1, further comprising a third antenna unit having a third antenna, and stacked on one surface of the second antenna unit.

12. The antenna module for the vehicle according to claim 11,
    wherein the third antenna unit comprising:
    a first terminal formed on one surface of a substrate;
    a first antenna pattern having one end connected with the first terminal, and formed along an outer circumferential portion of one surface of the substrate;
    a second terminal spaced apart from the first terminal and formed on one surface of the substrate; and
    a second antenna pattern having one end connected with the second terminal, formed along an outer circumferential portion of one surface of the substrate, and having the other end spaced apart from the other end of the first antenna pattern.

* * * * *